United States Patent [19]

Ito et al.

[11] Patent Number: 5,132,912
[45] Date of Patent: Jul. 21, 1992

[54] NUMERICAL CONTROL METHOD AND SYSTEM

[75] Inventors: Kenji Ito; Masato Ryoki, both of Ooguchi, Japan

[73] Assignee: Kabushiki Kaisha Okuma Tekkusho, Aichi, Japan

[21] Appl. No.: 514,836

[22] Filed: Apr. 26, 1990

[30] Foreign Application Priority Data

Apr. 28, 1989 [JP] Japan ................... 1-111599

[51] Int. Cl.$^5$ ............................................. G05B 19/24
[52] U.S. Cl. ........................ 364/474.02; 364/474.15; 364/474.30; 318/571
[58] Field of Search ............. 364/474.02, 474.12, 364/474.15, 474.16, 474.19, 474.28, 474.3, 474.31, 474.32, 474.34; 318/571, 573, 39

[56] References Cited

U.S. PATENT DOCUMENTS 4,656,405  4/1987  Kiya et al. ................ 364/474.02
4,879,660  11/1989 Asakura et al. ............. 364/474.3
4,912,385  3/1990  Kawamura et al. .......... 318/571
4,985,841  1/1991  Iwagaya ................... 364/474.02

FOREIGN PATENT DOCUMENTS

3814243 11/1988 Fed. Rep. of Germany ................. 364/474.02

Primary Examiner—Jerry Smith
Assistant Examiner—Thomas E. Brown
Attorney, Agent, or Firm—Wenderoth, Lind & Ponack

[57] ABSTRACT

A numerical control method and an apparatus sets the feed rate at the time the first action ends as a tapping feed rate, and sets the spindle rate at the time the second action ends as a tapping spindle rate, and starts the third action after the first and second actions end simultaneously. In a tapping process where the spindle angle at the start position is set at a predetermined tapping start angle, the first action for setting the feed shaft position at the tapping start position and the second action for setting the spindle angle as the tapping start angle are executed simultaneously, and the third action is executed without changing the feed and spindle rates because the feed rate has already been set at the tapping feed rate and the spindle rate has already been set at the spindle tapping rate at the time when the first and second actions end. The series of actions such as reducing, suspending, and increasing the speed of the feed shaft in the second action every time a tapping is performed can be avoided so as to thereby achieve a higher speed tapping as well as a higher productivity.

5 Claims, 9 Drawing Sheets

NUMERICAL CONTROL METHOD AND SYSTEM

BACKGROUND OF THE INVENTION

The present invention relates to a numerical control (NC) apparatus, and more particularly to an NC method for tapping using a cutting tool or a tapper under synchronized control over a feed shaft and a spindle, and an apparatus therefor.

The tapping process under numerical control is generally conducted by issuing instructions in tapping process cycles in a machining program for a start position, an end position, a tapping feed rate, a tapping spindle rate, etc.

Figure 1:
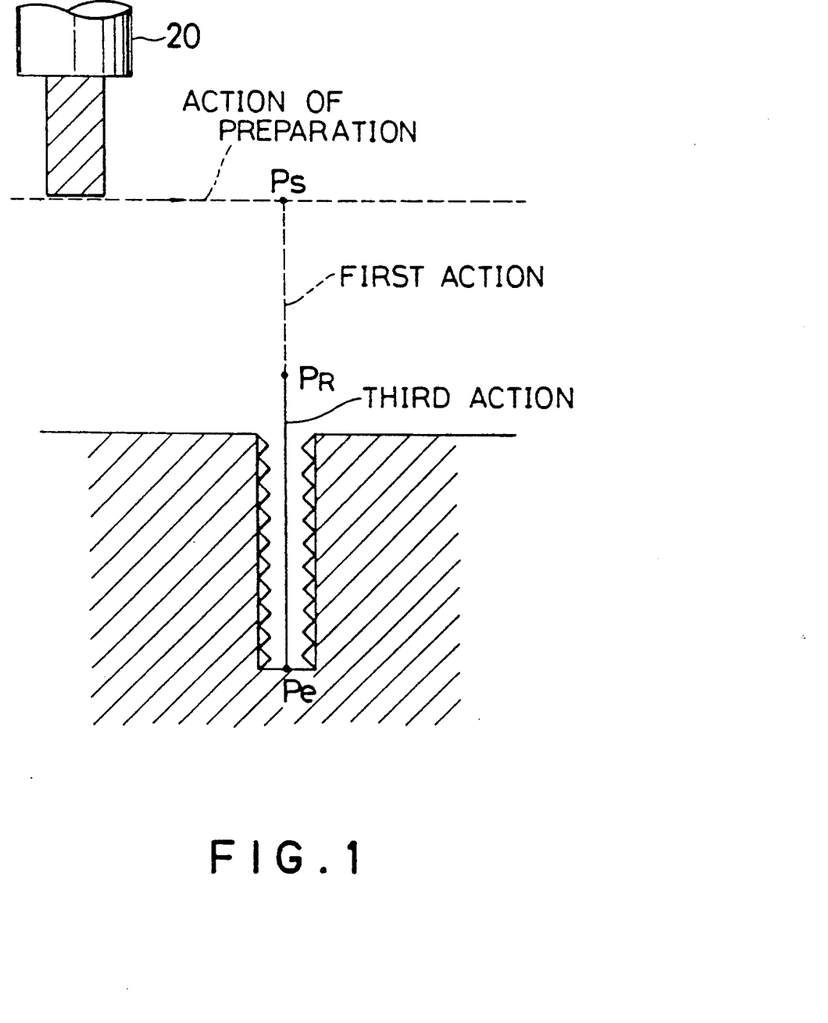
FIG. 1 is an explanatory view to show an embodiment of the tapping process.

FIG. 1 shows an example of a tapping machining cycle with a tool (tapper) 20, which is generally referred to as a tapping cycle. According to this machining program, a tool or a tapper 20 is moved to a tapping-ready position $P_S$ commanded by the program (action of preparation) and to a tapping start position $P_R$ (the first action). When the action to move the tool 20 to the tapping start position $P_R$ is ended, the feed shaft movement and the spindle rotation are synchronized based on the feed rate and the spindle rate, and the tool 20 is moved to a tapping and position $P_e$ and then returned to the position $P_R$ by reversely rotating the spindle (the third action). When the third action is ended and tool 20 is positioned at the tapping start position $P_R$, the tool 20 is then moved to a start position $P_S$ for the next machining cycle.

Since the demand has increased for automated assembly processes such as the one for tightening a screw, it is required to set the spindle at a predetermined angle at the tapping start position $P_R$. In order to meet such a requirement, there has been proposed a tapping cycle which has a second action additionally so that a tapping start angle is command by a machining program, and the spindle angle is set at the command angle at the position $P_R$.

Figure 2:
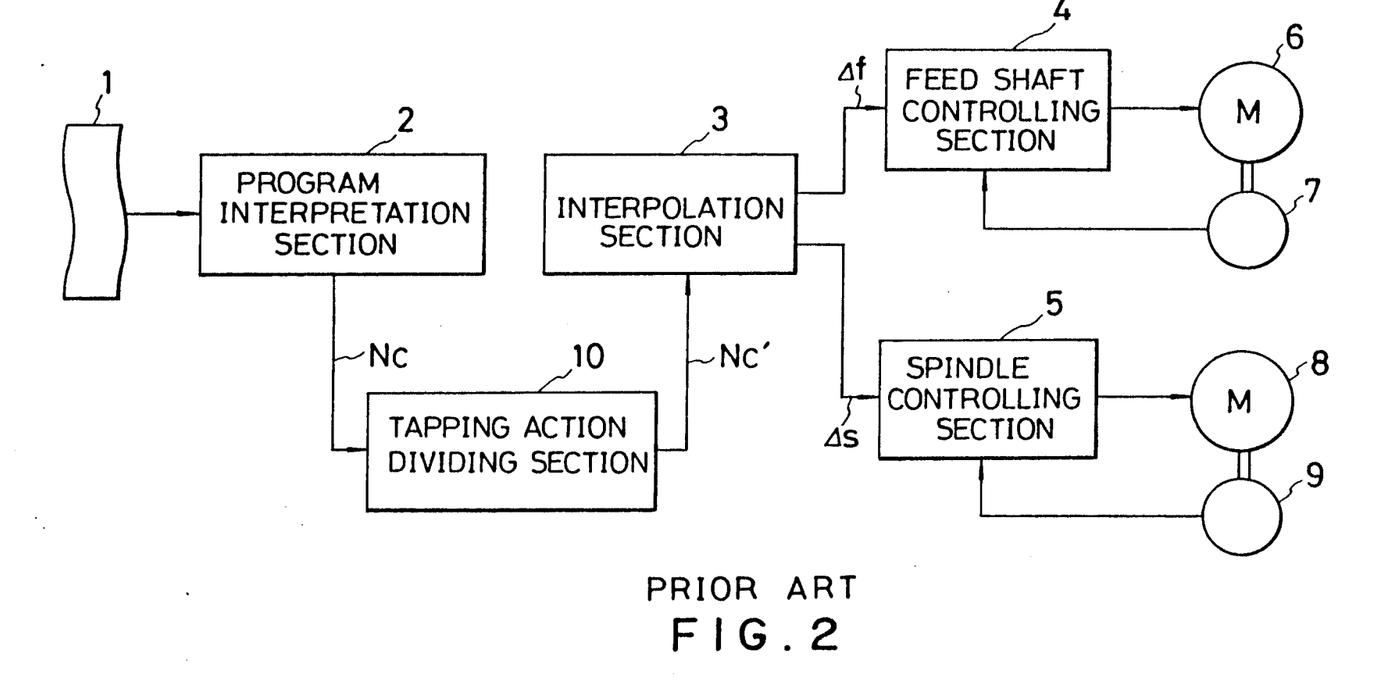
FIG. 2 is a block diagram to show an embodiment of the NC apparatus which realizes the method in the prior art.

FIG. 2 is a block diagram to show a prior art embodiment of the NC apparatus which can realize the aforementioned tapping cycle.

A machining program 1 is inputted to an NC apparatus via a tape reader (not shown), and the data of the machining program 1 is read in at a program interpretation section 2 for each block. The program interpretation section 2 analyses the data which is being consequently read in the section of one block, and calculates the first NC command value $N_C$. The first NC command value $N_C$ comprises generally a G-code, a shaft movement command, a commanded feed rate, a spindle rotation rate, etc. The first NC command value $N_C$ for tapping process comprises a G-code designating a tapping process, a tapping start position $P_R$, a tapping end position $P_e$, a tapping start angle $\theta_R$, a tapping feed rate $V_R$, a tapping spindle rate $W_R$, etc. Although the above commands are given in a program in this embodiment, they may be given by a switch such as a panel. The first NC command value $N_C$ which has been calculated by the program interpretation section 2 is sent to a tapping action dividing section 10, and upon receipt of a G-code designating the tapping process, the tapping action dividing section 10 calculates the second NC command value $N_C'$ which defines the first action for moving the feed rate at the tapping start position $P_R$, and sends the value to a interpolation section 3. The interpolation section 3 calculates a feed shaft displacement $\Delta f$ per unit time and a spindle displacement $\Delta S$ per unit time based on the second NC command value $N_C$, and sends them to a feed shaft controlling section 4 and a spindle controlling section 5, respectively. The controlling section 4 and 5 drive a feed shaft motor 6 and a spindle motor 8 by a feed back control with a feed shaft position detector 7 and a spindle angle detector 9 to execute the first action, respectively.

The tapping action dividing section 10 calculates the second NC command value $N_C'$ for the second action setting the spindle angle at a tapping start angle $\theta_R$, and sends the second NC command value $N_C'$ to the interpolation section 3 when the first action has finished at the interpolation section 3. The actions taken by the interpolation section 3 subsequent thereto are similar to the one mentioned above, and the description will therefore be omitted. The tapping action dividing section 10 calculates a second NC command value $N_C'$ for the third action for synchronizing the feed shaft with the spindle based on the feed rate $V_R$ and the spindle rate $W_R$ and moving the feed shaft to the tapping end position $P_e$, and sends the second NC command value $N_C'$ to the interpolation section 3 when the interpolation section 3 has finished the second action. Subsequent actions of the interpolation section 3 are similar to the first action mentioned above, and the description will be omitted. When the tapping action dividing section 10 receives a G-code other than the G-code designating the tapping process, the tapping action dividing section 10 sends the first NC command value $N_C$ as the second NC command value $N_C'$ to the interpolation section 3 as is.

Figure 3:
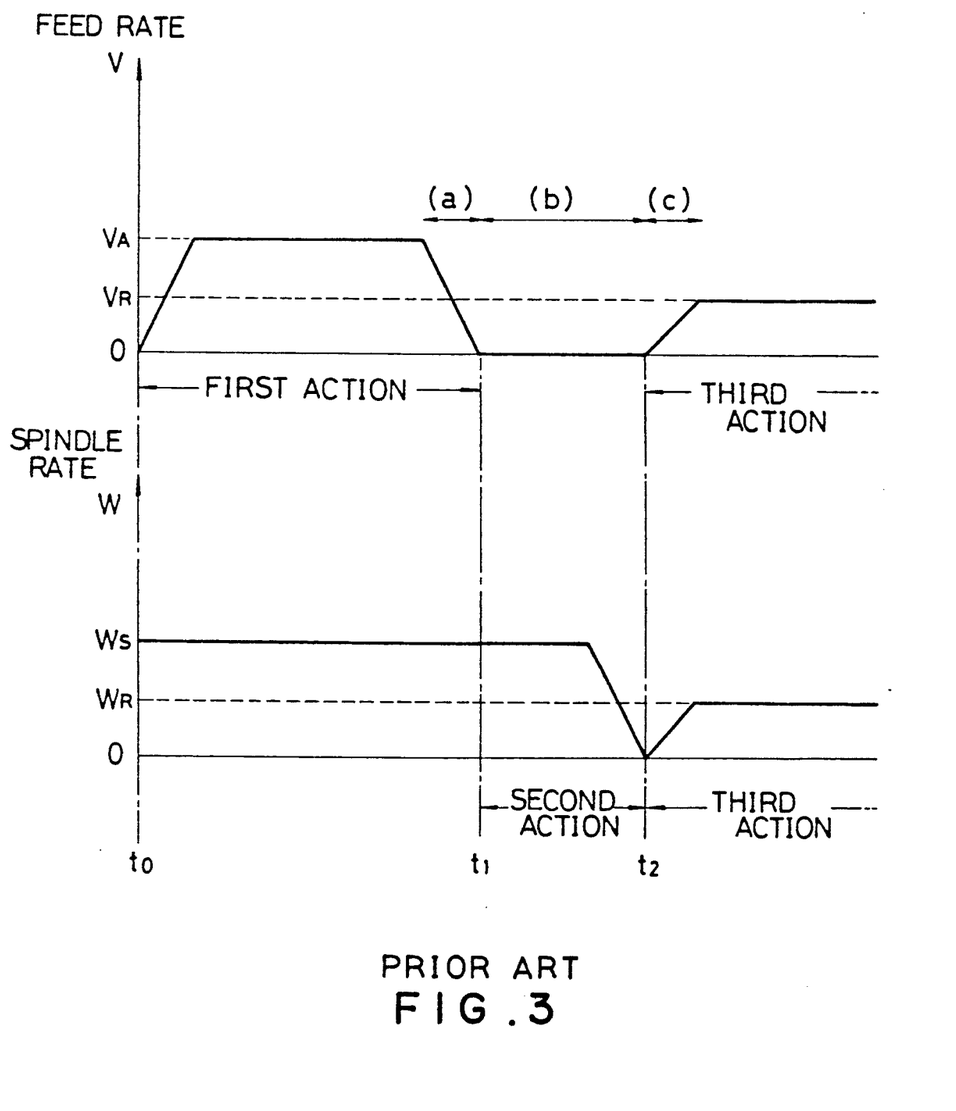
FIG. 3 is a timing chart to show an example of chronological changes of the feed rate and the spindle rate in the prior art NC method.

FIG. 3 shows an example of the chronological changes in the feed rate V and in the spindle rate W according to the prior art NC apparatus wherein the feed shaft position, the spindle angle, the feed rate and the spindle rate are expressed in the coordinates P(t), $\theta(t)$, V(t) and W(t) against the time t. The feed rate at the start of the first action is set at $V_S$ and the spindle rate at the start of the second action is set at $W_S$, but the feed rate at the start of the first action is assumed to be suspended and expressed as $V_S=0$. At the start of the first action or at $t_0$, the relationship $V(t_0)=V_S=0$ holds. At the end of the first action or at $t_1$, the relationship $P(t_1)=P_R$, $V(t_1)=0$ holds. At the end time $t_1$ of the first action, the second action starts and the relationship $W(t_1)=W_S$ holds. At the end time point $t_2$ of the second action, the relationship $\theta(t_2)=\theta_R$, $W(t_2)=0$ holds. The third action starts at the end point $t_2$ of the second action. The maximum feed rate $V_A$ of the first action may be commanded as the tolerable maximum feed rate in the machining program 1 or may be incorporated as an eigenvalue to the machine within the NC apparatus. It becomes possible to set the spindle angle at the tapping start position $P_R$ constantly at a commanded value in a prior art NC apparatus such as that described above.

However, for each of a tapping process, it is necessary in the above prior art device to conduct the second action after having the first action end or more particularly after having the feed shaft movement suspended. As shown in FIG. 3, every time a tapping process is conducted, an action comprising the steps of (a) portion reducing the feed rate, (b) portion suspending the feed shaft for the time period calculated by $(t_2-t_1)$, and (c) portion accelerating the feed shaft rate is required.

In tapping processes, a tool is generally used to tap threads in plural screws continuously in order to prevent time loses which would otherwise be caused by replacing tools. The necessity to conduct the second action of reduction, suspension and acceleration of the speed of the feed shaft arises every time a tapping process ends to thereby inconveniently increase the required machining time. More particularly, even if the tapping machining process is added to a function to set the spindle angle at the start point to be a predetermined angle by command, the apparatus needs to follow the processes comprising the first action to move the feed shaft at a tapping start position by a command in advance, the second action to set the spindle angle at the predetermined tapping start angle, and the third action to synchronize the feed shaft and the spindle based on the preinstructed feed rate and the spindle rate; but each of the actions had to wait for the preceding action to have finished before starting to thereby increase the processing time inconveniently.

SUMMARY OF THE INVENTION

The present invention was contrived to eliminate these inconveniences in the prior art and aims at providing an NC method and an apparatus therefor which conducts the first and the second actions simultaneously so as to solve the problem in the prior art of having to slow down the feed shaft speed and suspending it while the second action is being conducted, and accelerating it when the third action started.

According to one aspect of the present invention, for achieving the objects described above, there is provided a numerical control method by means of the numerical control apparatus which taps by a first action for setting a feed shaft position at a predetermined tapping start position, a second action for setting a spindle angle at a predetermined tapping start angle and a third action for synchronizing a feed shaft and a spindle based on the predetermined tapping feed rate and tapping spindle rate, which is characterized in that the feed rate at the end of said first action is set as the feed rate for tapping, the spindle rate at the end of said second action is set as said tapping spindle rate, and said third action is made to start after having finished said first and second actions simultaneously.

According to another aspect of the present invention, there is provided a numerical control device which controls tapping by a first action for setting a feed shaft position at a predetermined tapping start position, a second action for setting spindle angle at a predetermined tapping start angle, and a third action for synchronizing a feed shaft and spindle based on a predetermined tapping feed rate and a tapping spindle rate, which is characterized in that the apparatus is provided with an acceleration/deceleration timing calculating section which calculates the timing of the second action based on the feed shaft position and the feed rate at the start of said first action, the spindle angle and the rate at the start of said second action, a tolerable maximum rate, a tapping start position, a tapping feed rate, a tapping start angle and a tapping spindle rate, and a tapping action defining section which executes said first and second actions simultaneously and then executes said third action.

The nature, principle and utility of the invention will become more apparent from the following detailed description when read in conjunction with the accompanying drawings.

DESCRIPTION OF THE PREFERRED EMBODIMENTS

Figure 4:
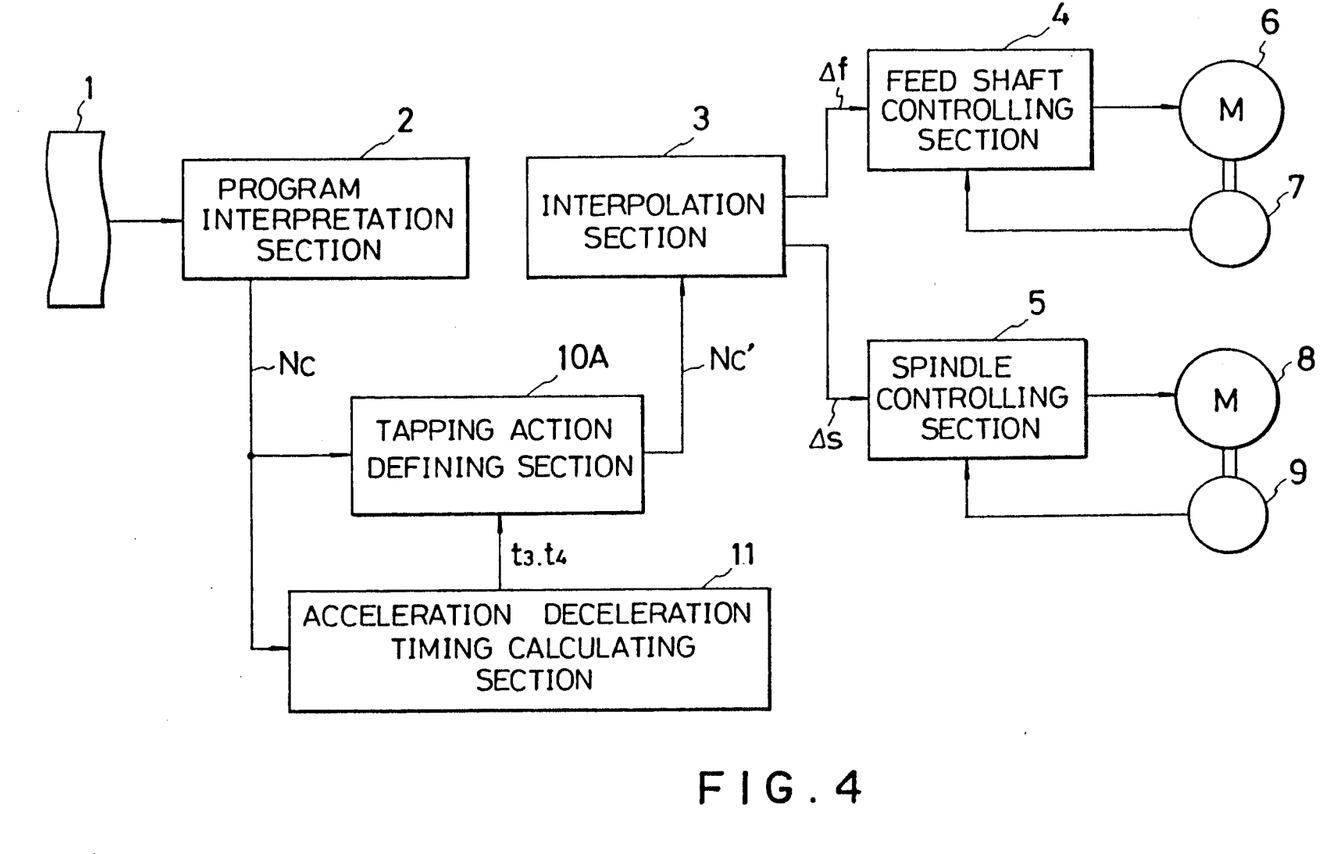
FIG. 4 is a block diagram to show an embodiment of an NC method according to the present invention.

FIG. 4 is a block diagram to show an embodiment of the NC apparatus according to the present invention in correspondence to FIG. 2. The same component parts are denoted with the same reference numerals and descriptions thereof are omitted. The present invention apparatus is provided with a tapping action defining section 10A replacing the conventional tapping action dividing section 10 and is newly provided with an acceleration/deceleration timing calculating section 11.

Figure 5:
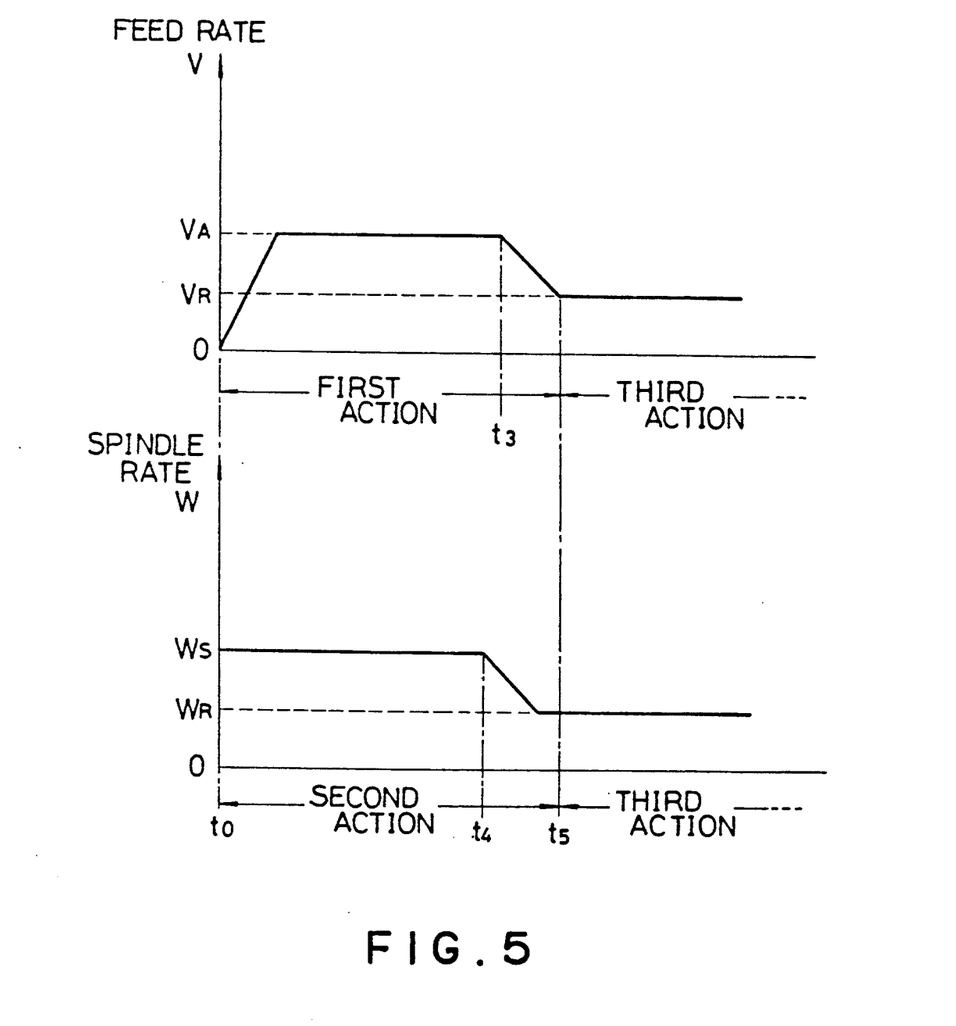
FIG. 5 is a timing chart to show an examples of chronological changes of the feed rate and the spindle rate in the present invention NC method.

The present invention apparatus is now described referring to FIG. 5 which shows chronological changes in the feed rate and the spindle rate. The feed rate, the feed shaft position, the spindle rate and the spindle angle at the time t are denoted as $V(t)$, $P(t)$, $W(t)$ and $\theta(t)$ respectively. When the acceleration/deceleration calculating section 11 recognizes that the first NC command value $N_C$ includes the G-code designating a tapping process, it calculates the acceleration/deceleration timing $t_3$ and the end time $t_5$ of the first action based on the feed shaft position $P_S$, the feed rate $V_S$, the tolerable maximum feed rate $V_A$ included in the first NC command value $N_C$, the tapping start position $P_R$, and the feed rate $V_R$ at the start time $t_0$ for the first action in such a manner that the relation $P(t_5)=P_R$, $V(t_5)=V_R$ holds at the end time $t_5$ for the first action, and the time executing the first action or the time $(t_5-t_0)$ becomes the minimum. It also causes the feed rate pattern of the first action to accelerate the feed rate pattern of the first action at the time $t_0$ to the rate $V_A$, and decelerate to the feed rate $V_R$ at the time $t_3$. Since the start time of the second action is made to coincide with the start time $t_0$ of the first action, and the execution time of the second time to coincide with the execution time of the first action, then the end time of the second action becomes the end time $t_5$ of the first action. The acceleration/deceleration timing calculating section 11 calculates the timing of the second action in a manner such that the relationship of $\theta(t_5)=\theta_R$, $W(t_5)=W_R$ holds at the end time $t_5$ of the second action, and determines the spindle rate pattern of the second action to decelerate the spindle rate to that at the time $t_4$ based on the spindle angle $\theta_S$, the spindle rate $W_S$, the tapping start angle $\theta_R$ included in the first NC command value $N_C$.

When the acceleration/deceleration timings $t_3$ and $t_4$ are sent to the tapping action defining section 10A similar to the above, the tapping action defining section 10A judges if the G-code is included in the first NC command; if yes, calculates the second NC command value $N_C{}'$ which defines the first action to set the feed shaft position at the tapping start position $P_R$ and the second action to set the spindle angle at the start angle $\theta_R$ to the acceleration/deceleration timings $t_3$ and $t_4$, and sends the second NC command value $N_C{}'$ to the interpolation section 3 at the time $t_0$ where the first and the second actions start. The tapping action defining section 10A calculates the second NC command value $N_C{}'$ which defines the third action to synchronize the feed shaft rate with the spindle based on the tapping spindle rate $W_R$ and the tapping read rate $V_R$ and moves the feed shaft to the end position $P_e$ and sends the second NC command value $N_C{}'$ to the interpolation section 3 at the end time $t_5$ of the first and second actions.

Figure 6:
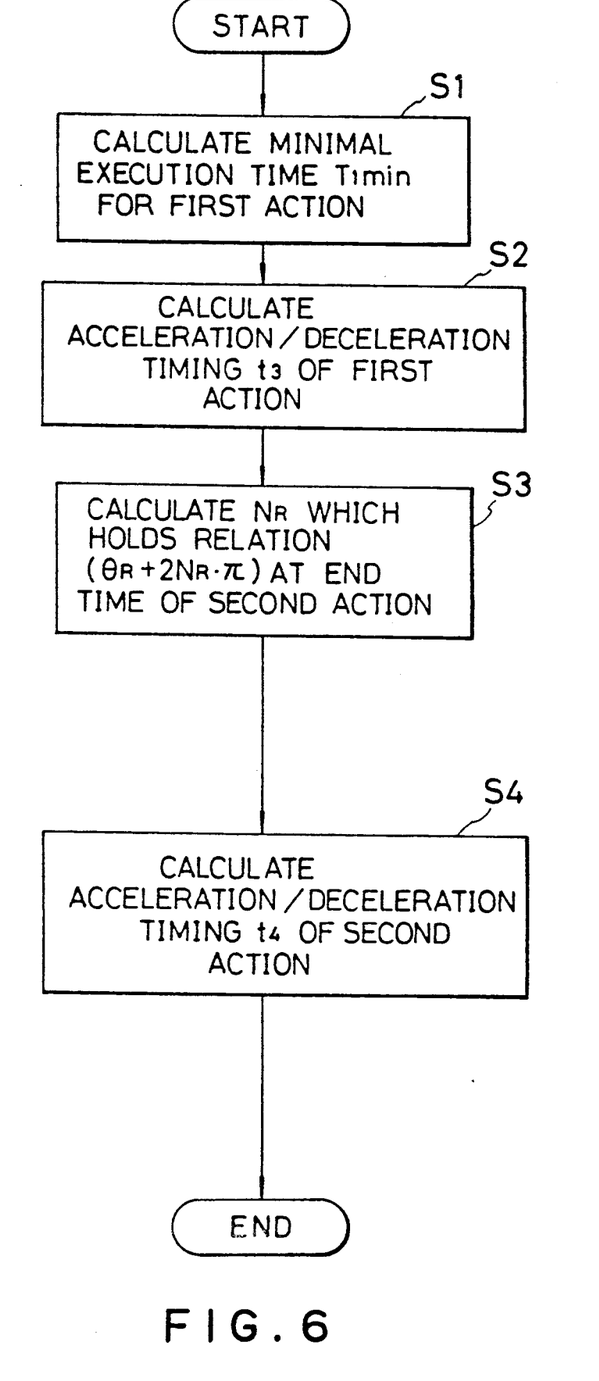
FIG. 6 is a flowchart to show an example of the present invention NC method.
Figure 7:
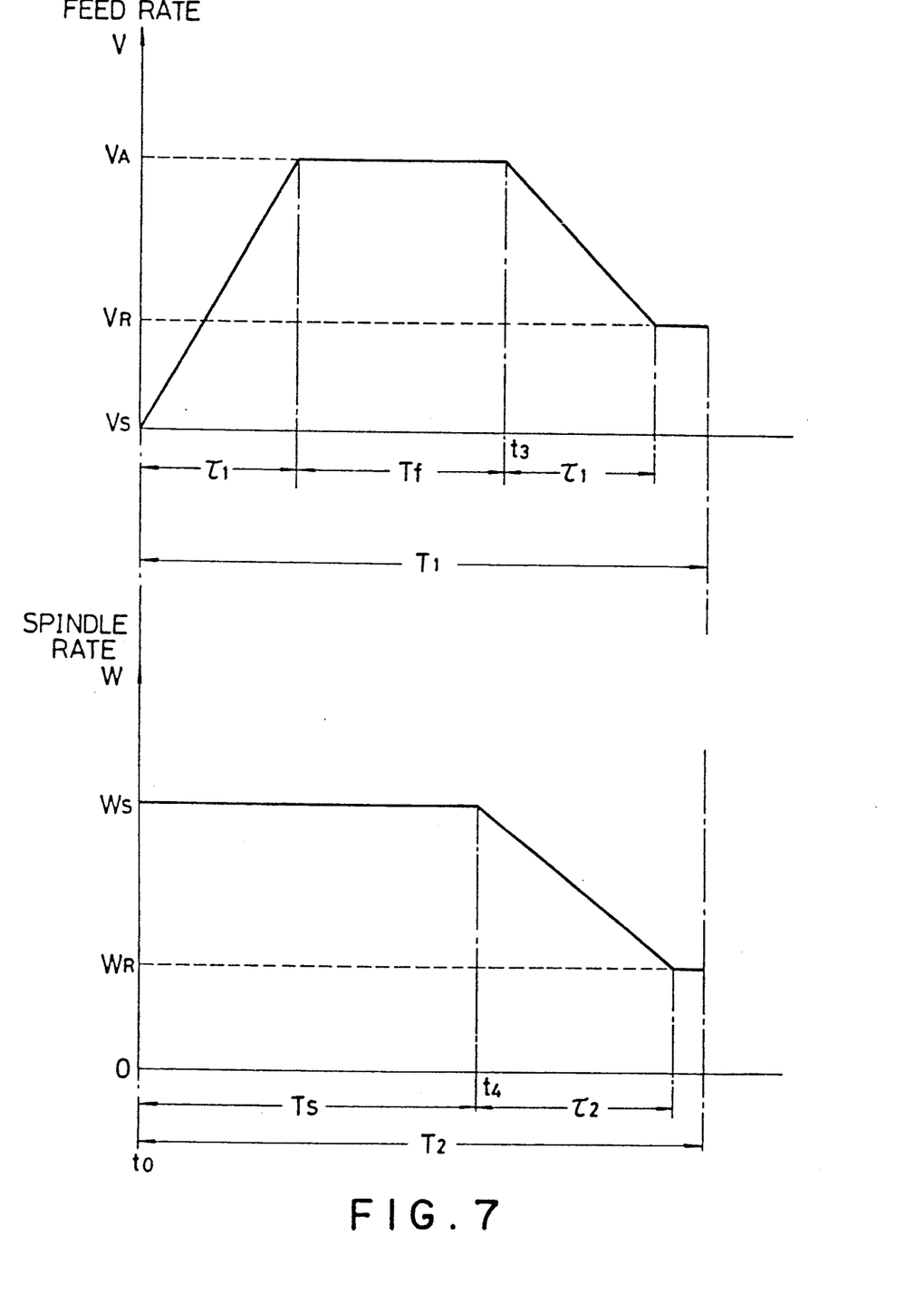
FIG. 7 is a timing chart to show a pattern of the first action feed rate and a pattern of the second action spindle rate in the present invention NC method.

A calculation method for the acceleration/deceleration timing $t_3$ of the first action and the acceleration/deceleration timing $t_4$ of the second action at the acceleration/deceleration timing calculating section 11 will be described referring to the flowchart in FIG. 6 and the feed rate pattern of the first action and the spindle rate pattern of the second action shown in FIG. 7.

It is assumed that the feed shaft position, the feed rate, the spindle angle and the spindle rate at the time t are denoted as $P(t)$, $V(t)$, $\theta(t)$ and $W(t)$. At the time $t_0$ when the first and the second actions are started, the relationship holds as below.

$$P(t_0) = P_S, \; V(t_0) = V_S, \; \theta(t_0) = \theta_S, \; W(t_0) = W_S \quad (1)$$

The feed shaft is assumed to be suspended at the start time $t_0$ of the first and second actions, and the relationship $V(t_0) = V_S = 0$ holds. It is assuming that the acceleration/deceleration time constant of the feed shaft is denoted as $\tau_1$ while that of the spindle as $\tau_2$, and the feed shaft starts to accelerate the rate to the due to $(\theta_R + 2N_R \cdot \pi)$ maximum rate $V_A$ at the start time $t_0$ of the first and the second actions. Then, the relationship $V(t_0 + \tau_1) = V_A$ holds. Further, the time when the feed rate becomes that due to $(\theta_R + 2N_R \cdot \pi)$ maximum rate $V_A$ in the feed rate pattern of the first action is denoted as $T_f$, and the time when the spindle rate is the spindle rate $W_S$ at the start time in the spindle rate pattern of the second action is denoted at $T_S$. The execution time of the first action is denoted as $T_1$, and that of the second action is denoted as $T_2$. Since the execution time of the first action is $T_1$, and $V(t_0 + T_1) = V_R$ and $P(t_0 + T_1) = P_R$, the relationship holds as below.

$$\int_0^{\tau_1} f_1(V_S, V_A, \tau_1, t)dt + V_A T_f + \int_0^{\tau_1} f_2(V_A, V_R, \tau_1, t)dt + V_R(T_1 - T_f - 2\tau_1) = P_R - P_S \quad (2)$$

wherein $f_1$ and $f_2$ denote the feed rate ($0 \leq t \leq \tau_1$) at the time t. If it is assumed that the acceleration/deceleration equation of the feed shaft is linear, the relationship holds as below.

$$(V_A - V_R)T_f + \tau_1/2 \cdot (-2V_A + V_S - 3V_R) + V_R T_1 = P_R - P_S \quad (3)$$

$$(0 \leq T_f \leq T_1 - 2\tau_1)$$

Since the execution time for the second action is $T_2$ and $W(t_0 + T_2) = W_R$, if it is assumed that $\theta(t_0 + T_2) = \theta_2$, the relationship holds as below.

$$\theta_2 + 2N_2 \cdot \pi = \theta_S + W_S T_S + \int_0^{\tau_2} g(W_S, W_R, \tau_2, t)dt + W_R(T_2 - \tau_2 - T_S) \quad (4)$$

wherein g denotes the spindle rate at the time t while the rate of the spindle change ($0 \leq t \leq \tau_2$), and $N_2$ is an integer.

If it is assumed that the acceleration/deceleration equation of the spindle is linear, the relationship holds as below.

$$\theta_2 + 2N_2 \cdot \pi = \theta_S + (W_S - W_R)T_S + \tau_2/2 \cdot (W_S - W_R) + W_R T_2$$

$$(0 \leq T_S \leq T_2 - \tau) \quad (5)$$

If it is assumed that the minimum execution time $T_1$ of the first action is $T_{1min}$, the execution time $T_{1min}$ for the first action is calculated (Step S1), and then the acceleration/deceleration timing $t_3$ is calculated (Step S2). In other words, as the execution time $T_{1min}$ is the time $t_1$ where the time $T_f$ of the tolerable maximum feed rate $V_A$ becomes maximum $T_1$, $T_f = T_1 - 2\tau_1$ is substituted in the equation (3) above, and the following equation is obtained.

$$T_{1min} = 1/V_A \cdot \{P_R - P_S - \tau_1/2 \cdot (V_S + V_R - 2V_A)\} \quad (6)$$

The acceleration/deceleration timing $t_3$ of the first action is expressed as below.

$$t_3 = t_0 + \tau_1 + T_f = t_0 + T_{1min} - \tau_1 \quad (7)$$

Then, when the execution time $T_2$ of the second action becomes the execution time $T_1$ min of the first action, $N_R$ which meets the relationship $(\theta_R + 2N_R \cdot \tau)$ at the end time of the second action is calculated. From the above equation (5), $N_R$ is obtained according to the equation below (Step S3).

$$\theta_R + 2N_R \cdot \tau = \theta_S + 2(W_S - W_R)T_S + \tau_2/2 \cdot (W_S - W_R) + W_R T_{1min}$$

$$(0 \leq T_S \leq T_{1min} - \tau_2) \quad (8)$$

If it is assumed in the equation (5), $0 \leq T_S \leq T_{1min} - \tau_2$, and the maximum value of $(\theta_2 + 2N_R \cdot \pi)$ is denoted as $(\theta_{2max} + 2N_{2max} \cdot \pi)$ while the minimum value is denoted as $(\theta_{2min} + 2N_{2min} \cdot \pi)$, the relationship hold as below when $W_S \geq W_R$.

$$\theta_{2max} + 2N_{2max} \cdot \pi = \theta_S + \tau_2/2 \cdot (W_R - W_S) + W_S T_{1min} \quad (9)$$

$$\theta_{2min} + 2N_{2min} \cdot \pi = \theta_S + \tau_2/2 \cdot (W_S - W_R) + W_R T_{1min} \quad (10)$$

If $W_S < W_R$, the relationship holds as below.

$$\theta_{2max} + 2N_{2max} \cdot \pi = \theta_S + \tau_2/2 \cdot (W_S - W_R) + W_R T_{1min} \quad (11)$$

$$\theta_{2min} + 2N_{2min} \cdot \pi = \theta_S + \tau_2/2 \cdot (W_R - W_S) + W_S T_{1min} \quad (12)$$

$$\theta_{2min} + 2N_{2min} \cdot \pi \leq \theta_R + 2N_R \cdot \pi \leq \theta_{2max} + 2N_{2max} \cdot \pi \quad (13)$$

If an $N_R$ which satisfies the equation (13) is selected, a desirable $N_R$ would be obtained.

Then, $(\theta_R + 2N_R \cdot \pi)$ is determined, and as the execution time $T_2$ of the second action becomes minimum at the execution time $T_{1min}$ of the first action, the time $T_S$ is calculated from the equation (5).

$$T_S = 1/(W'_S - W_R) \cdot \{\theta_R + 2N_R \cdot \pi - \theta_S - \tau_2/2 \cdot (W'_S - W_R) - W_R T_{1min}\} \quad (14)$$

The acceleration/deceleration timing $t_4$ of the second action is calculated as below (Step S4).

$$t_4 = t_0 + T_S \quad (15)$$

As the acceleration/deceleration timing $t_3$ of the first action and the acceleration/deceleration timing $t_4$ of the second action are calculated as above, the feed rate of the first action assumes the pattern that the starts to change at the start time $t_0$ of the first and second actions, reaches tolerable maximum feed rate $V_A$ at the time $(t_0 + \tau_1)$, starts to change at the acceleration/deceleration timing $t_3$ of the first action, and becomes the tapping feed rate $V_R$ at the end time $t_5$ of the first and second actions. The spindle rate pattern of the second action assumes the course that the rate starts to change at the acceleration/deceleration timing $t_4$ of the second action, reaches the tapping spindle rate $W_R$ at the end time $t_5$ of the first and second actions.

If an $N_R$ is not present to satisfy the equation above (13), the second action cannot end at the end time of the first action. As counter-measures to deal with such cases, the following two solutions are conceivable.

① First method:
Out of the execution times $T_2$ of the second action at the time the second action ends, a value which is minimum and yet greater than the first action minimum execution time $T_{1min}$ is calculated, and is newly designated as the execution time of the first action, and the feed rate of the first action pattern is modified.

② Second method:
A spindle rate $W_S'$ and a spindle angle $\theta_S'$ are selected at the start time $t_0$ of the first and second actions in a manner to finish the second action, and the feed rate pattern and the spindle rate pattern of the preceding actions are determined in a manner to meet the relationship defined by the equation below at the start time $t_0$ of the first and second actions.

$$P(t_0) = P_S, V(t_0) = V_S, \theta(t_0) = \theta_S', W(t_0) = W_S' \quad (16)$$

Figure 8:
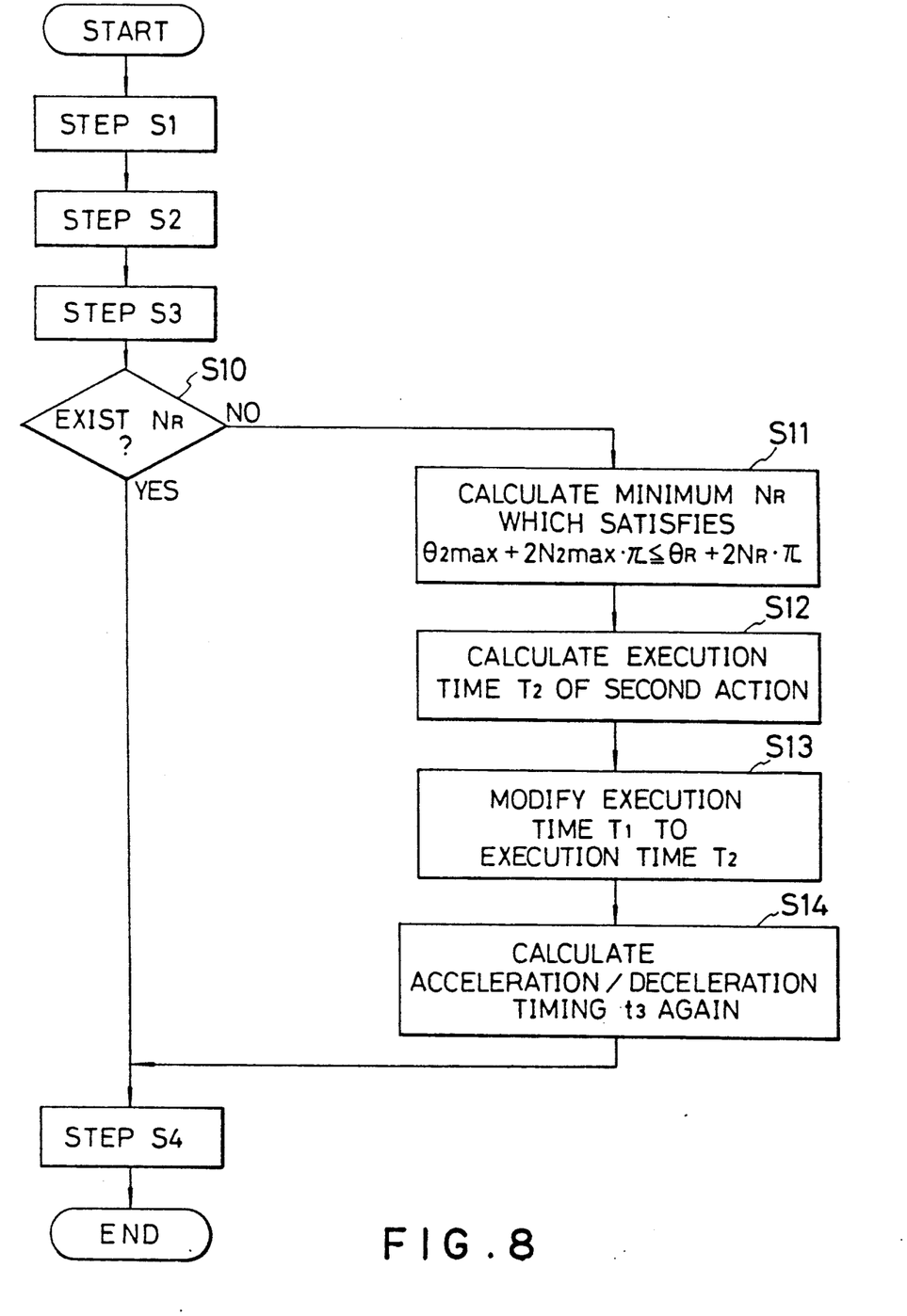
FIGS. 8 and 9 are flowcharts to respectively show embodiments of the present invention NC method.

An example of the first method is described below referring to the flow chart shown in FIG. 8. The same process steps are denoted with the same step numbers as in FIG. 6, and the description is therefore omitted.

After the above Step S3, it is judged whether or not an $N_R$ exists which satisfies the equation (13) (Step S10), and if not, an $N_R$ is calculated which is greater than the execution time $T_{1min}$ of the first action where the second action execution time $T_2$ become minimum at the time the second action ends and which is yet the minimum value among them (Step S11). In other words, an $N_R$ may be selected by satisfying the equation below.

$$\theta_{2max} + 2N_{2max} \cdot \pi \leq \theta_R + 2N_R \cdot \pi \quad (17)$$

$(\theta_{2max} + 2N_{2max} \cdot \pi)$ may be obtained out of the equations (9) and (11) when $\tau_2 \leq T_{1min}$, and out of the equation (5) when $\tau_2 > T_{1min}$ by substituting $T_S = 0$, $T_2 = \tau_2$.

$$\theta_{2max} + 2N_{2max} \cdot \pi = \theta_S + \tau_2/2 \cdot (W'_S + W_R) \quad (18)$$

$$T_2 = 1/W_R \cdot \{\theta_R + 2N_R \cdot \pi - \theta_S - (W'_S - W_R)T_S - \tau_2/2 \cdot (W'_S - W_R)\} \quad (19)$$

The execution time $T_2$ of the second action is calculated due to $(\theta_R + 2N_R \cdot \pi)$ (Step S12), and is newly designated as the execution time $T_1$ of the first action (Step S13). In short, when $W_S \geq W_R$, the relationship holds as $T_S = T_2 - \tau_2$, the execution time $T_2$ becomes minimum, and the relationship holds as below.

$$T_1 = T_2 = 1/W_S \cdot \{\theta_R + 2N_R \cdot \pi - \theta_S - \tau_2/2 \cdot (W_R - W_S)\} \quad (20)$$

When $W_S < W_R$, the relationship holds as $T_S = 0$, the execution time $T_2$ becomes minimum to meet the relationship below.

$$T_1 = T_2 = 1/W_R \cdot \{\theta_R + 2N_R \cdot \pi - \theta_S - \tau_2/2 \cdot (W_S - W_R)\} \quad (21)$$

As the execution time $T_1$ of the first action is modified to be the execution time $T_2$ of the second action which has been calculated, the acceleration/deceleration timing $t_3$ of the first action should be calculated again (Step S14). The relationship holds as below out of the equation (3).

$$T_f = 1/(V_S - V_R) \cdot \{P_R - P_S - \tau_1/2 \cdot (2V_A + V_S - 3V_R) - V_R T_1\} \quad (22)$$

As the time $T_1$ in the equation (22) has been calculated by the Step S13, the time $T_f$ is obtained.

$$t_3 = t_0 + \tau_1 + T_f \quad (23)$$

Out of the equation above, the acceleration/deceleration timing $t_3$ of the first action is calculated.

Figure 9:
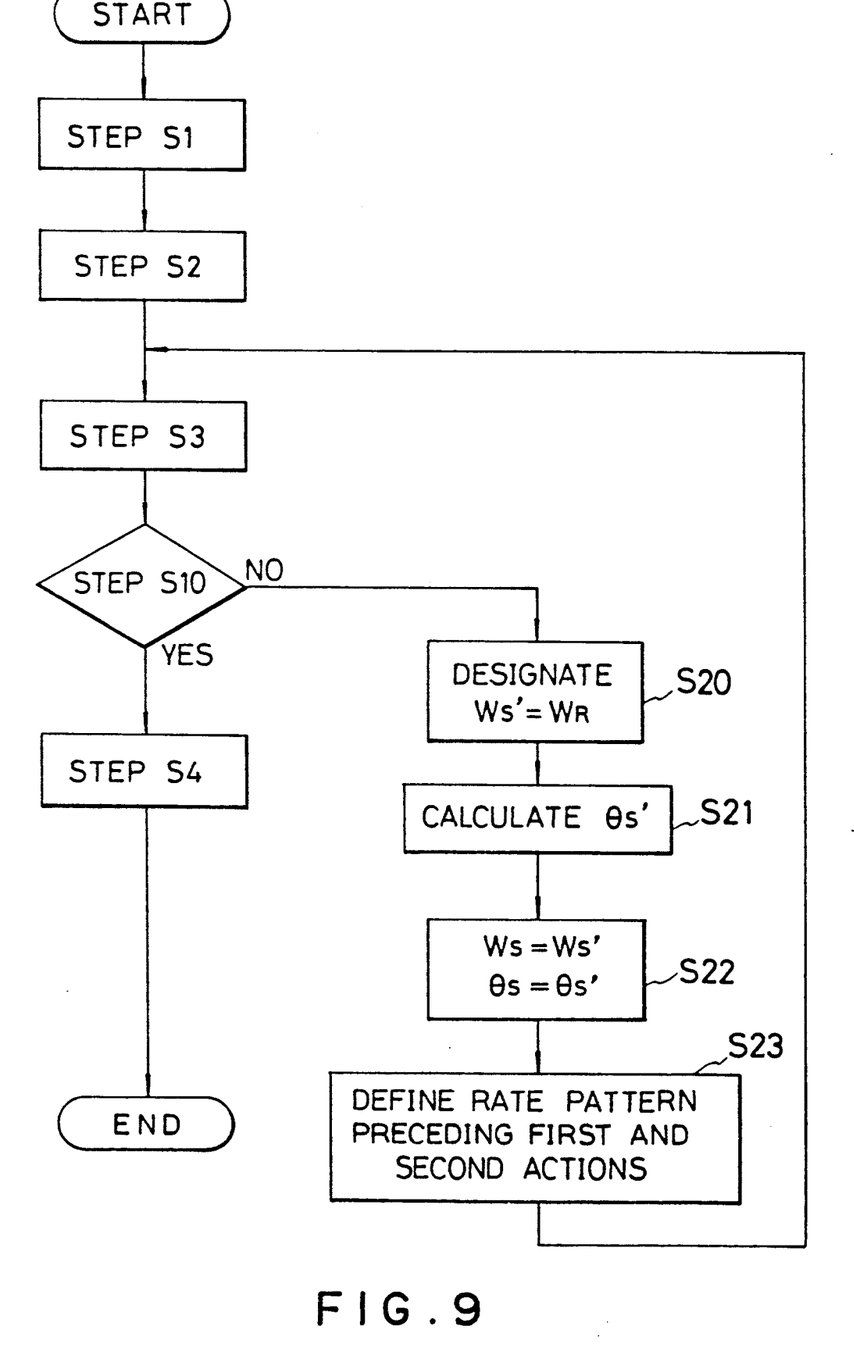

The second method is described referring to the flowchart shown in FIG. 9. The same steps are denoted as the same step numerals as in FIGS. 6 and 8 and the description will therefore be omitted.

When no $N_R$ exists at the Step S10, the spindle rate at the start time $t_0$ of the first and second actions is designated as the tapping spindle rate $W_R$ (Step S20). In other words, $W_S'$ is set as $W_S' = W_R$. The spindle angle at the start time $t_0$ of the first and second actions is calculated (Step S21). $\theta_S'$ is calculated by substituting $W_S = W_R$, $\theta_2 = \theta_R$ in the equation (5), and $\theta_S'$ is calculated from the equation (24) by substituting the relation $\theta_S = \theta_S'$, $W_S = W_S'$ (Step S22).

$$\theta_S' = \theta_R + 2N_2 \cdot \pi - W_R T_{1min} \quad (24)$$

$$(0 \leq \theta_S' < 2\pi)$$

The Step S3 and thereafter will be executed and the feed rate pattern and the spindle rate pattern are defined for the preceding first and second actions by satisfying the relationship below at the time the previous first and second actions end or the start time $t_0$ of the actions (Step S23).

$$P(t_0) = P_S, V(t_0) = V_S, \theta(t_0) = \theta_S', W(t_0) = W_S' \quad (25)$$

As described in details in the foregoing statement, according to the present invention numerical control apparatus for the tapping consisting the first action which moves the feed shaft to the position designated in advance for the tapping start, the second action which sets the spindle angle at the tapping start angle designated in advance, and the third action which synchronizes the feed shaft and the spindle based on the designated tapping feed rate and the tapping spindle rate, the apparatus can achieve a high speed tapping process by improving the patterns of the actions which used to slow and suspend the feed shaft, suspend it while the second action is being performed, to increase the rate of the feed shaft again at the time when the third action starts to newly the process to designate the feed rate at the end time of the first action as the tapping feed rate, the spindle rate at the end of the second action as the tapping spindle rate, to finish the first and second actions simultaneously and then to start the third action in one continuous action. Even when a single tool is used for continuous tapping operation to produce a large number of screws, the present invention apparatus can achieve a high speed tapping process to enhance.

What is claimed is:

1. A numerical control method by means of the numerical control apparatus which taps by a first action for setting a feed shaft position at a predetermined tapping start position, a second action for setting a spindle angle at a predetermined tapping start angle and a third action for synchronizing a feed shaft and a spindle based on the predetermined tapping feed rate and tapping spindle rate, the method comprising the steps of: setting the feed rate at the end of the first action as the feed rate for tapping; setting the spindle rate at the end of the second action as the tapping spindle rate, and starting the third action after having finished the first and second actions simultaneously.

2. A numerical control method as claimed in claim 1, wherein out of the feed rate patterns of the first action calculated from the feed rate, the tolerable maximum feed rate at the start time of the first action, the tapping feed rate and the displacement of the feed shaft within the first action, a feed rate pattern which minimizes an execution time of the first action is determined, and an execution time of the second action is determined as the execution time of the first action in the feed rate pattern, and the first and second actions start at the same time.

3. A numerical control method as claimed in claim 2, wherein if said action has not finished at the end time of the first action, the feed rate pattern of the first action is modified, the execution time of the second action is designated as the execution time of the first action in the modified pattern, and the first and second actions are started simultaneously.

4. A numerical control method as claimed in claim 2, wherein when the second action has not finished at the end time of the first action, the spindle rate and angle at the start of the second action are calculated, and the spindle rate and angle are reset at the calculated spindle rate and angle at the time when actions preceding the first and second actions end.

5. A numerical control system which controls tapping by a first action for setting a feed shaft position at a predetermined tapping start position, a second action for setting spindle angle at a predetermined tapping start angle, and a third action for synchronizing a feed shaft and spindle based on a predetermined tapping feed rate and a tapping spindle rate, wherein the system comprises: an acceleration/deceleration timing calculating section for calculating the timings of said first and second actions based on the feed shaft position and the feed rate at the start of said first action, the spindle angle and the rate at the start of the second action, a tolerable maximum rate, a tapping start position, tapping spindle rate, a tapping start angle and a tapping spindle rate, and a tapping action defining section for executing said first and second actions simultaneously and then executing said third action.

* * * * *